United States Patent [19]
Biondetti

[11] 3,846,883
[45] Nov. 12, 1974

[54] ROLLER FOR A PRESSURE TREATMENT OF WEBS

[75] Inventor: Mario Biondetti, Schio, Italy

[73] Assignee: Escher Wyss Aktiengesellschaft, Zurich, Switzerland

[22] Filed: Sept. 17, 1973

[21] Appl. No.: 397,926

[30] Foreign Application Priority Data
Sept. 16, 1972 Germany.............................. 2245597

[52] U.S. Cl............................................. 29/116 AD
[51] Int. Cl.............................................. B21b 13/02
[58] Field of Search..... 29/116 AD, 113 AD; 92/58, 92/172; 91/488

[56] References Cited
UNITED STATES PATENTS

| | | | |
|---|---|---|---|
| 2,901,979 | 9/1959 | Henrichsen | 91/488 X |
| 3,223,046 | 12/1965 | Eickmann | 91/488 X |
| 3,255,706 | 6/1966 | Eickmann | 91/488 |
| 3,430,319 | 3/1969 | Skaugen | 29/116 AD |
| 3,587,152 | 6/1971 | Hold | 29/116 AD |

FOREIGN PATENTS OR APPLICATIONS

| | | | |
|---|---|---|---|
| 1,403,754 | 1/1969 | Germany | 91/488 |
| 6,509,484 | 2/1966 | Netherlands | 29/113 AD |

*Primary Examiner*—Alfred R. Guest
*Attorney, Agent, or Firm*—Pennie & Edmonds

[57] ABSTRACT

In order to avoid friction in the transmission of the flexure compensating forces via the piston and bearing shoe units, a chamber is formed between the bearing shoe and piston to receive a pressure medium for partially relieving the joint between the bearing shoe and piston of load. An annular seal is also provided between the bearing shoe and piston in the plane of the pivot point of the joint to seal the relief pressure chamber.

9 Claims, 5 Drawing Figures

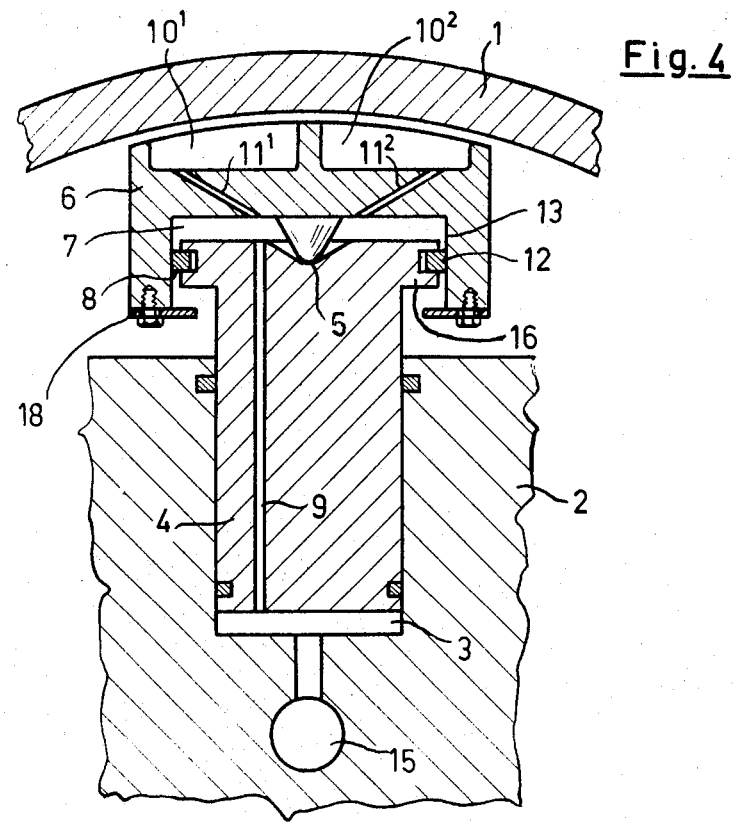
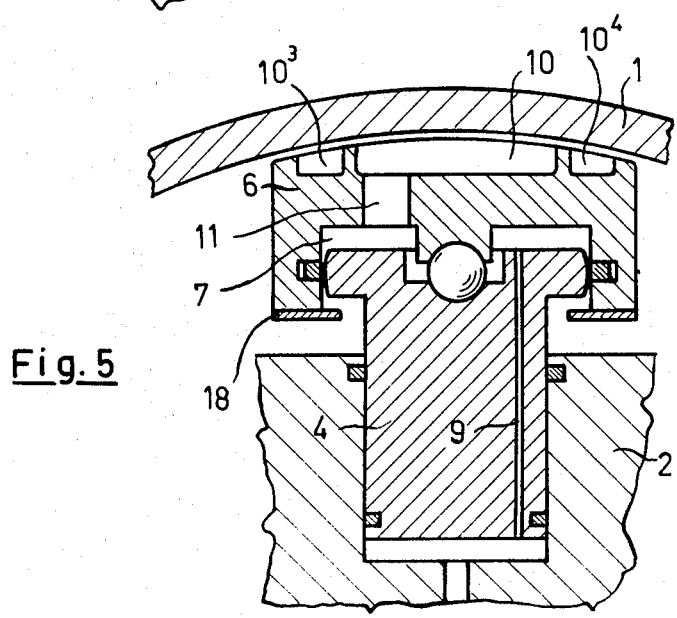

3,846,883

ROLLER FOR A PRESSURE TREATMENT OF WEBS

This invention relates to a roller for a pressure treatment of webs. More particularly, this invention relates to a roller having means to provide for flexure equalization during a pressure treatment of travelling webs, particularly, paper webs.

Heretofore, various types of rollers have been used to impart a pressure force on travelling webs. However, in many cases, the rollers due to various factors, such as their own weight, have been bowed or deflected during use. In order to overcome this, it has been known to construct the rollers in a form which would permit the flexing to be compensated or eliminated. In one instance, it has been known to construct a roller of a hollow cylindrical rotatable shell, of a non-rotatable yoke extending through the shell and supported at both ends, and of a means for transmitting pressure between the shell and the yoke. Such a means has usually included pressure pistons which have been guided with a good fit in cylinders of the yoke and bearing shoes which bear by way of a joint on the pressure piston. A roller of this kind is disclosed in the German Auslegeschrift Pat. No. 1,193,792 which is a counterpart to U.S. Pat. No. 3,131,625 and Reissue U.S. Pat. 26,619. This roller is intended to allow the bearing shoe which bears on the unflexed shell to become inclined relative to the pressure piston which assumes an angular position in accordance with the flexure of the joke. The joint disclosed in the German Auslegeschrift Pat. No. 1,193,792 is, however, subject to large frictional forces which substantially prevent the bearing shoe from becoming inclined with respect to the pressure piston.

Accordingly, it is an object of the invention to reduce the friction in the joint of a known roller to a fraction which occurs in the known roller.

It is another object of the invention to provide a roller which is able to obtain a flexure equalization in a simple manner.

Briefly, the invention provides a roller made up of a hollow cylindrical shell capable of rotation, a non-rotatable yoke within the shell and a means for transmitting pressure between the yoke and shell. This means includes at least one cylinder in the yoke which is adapted to receive a pressure medium, a pressure piston slidably mounted in the cylinder on a joint and a bearing shoe pivotally mounted on the joint. This means, according to the invention, further includes a chamber defined between the bearing shoe and piston for receiving pressure medium and an annular seal between the piston and bearing shoe in a plane extending through a pivot point of the joint. The chamber is intended to receive pressure medium in order to at least partially relieve the joint of load. To this end, the relief pressure chamber is connected to the cylinder via a connecting duct to receive the pressure medium.

In one embodiment, the bearing shoe is provided with a hydrostatic bearing pocket in facing relation to the shell while the relief pressure chamber which is formed between the bearing shoe and the pressure piston communicates through connecting ducts on the one hand with the pressure chamber of the cylinder of the pressure piston and on the other hand with the bearing pocket of the bearing shoe. In this embodiment, at least one of the two connecting ducts is constructed as a restrictor means.

Advantageously, the annular seal is in the form of a ring seal, the outer part of which is guided in a groove in either of the piston or bearing shoe while the internal surface bears sealingly on the spherical surface on the other of the piston or bearing shoe. In addition, the pivoting point of the joint and the sphere center of the spherical surface coincide. In one case, the seal is mounted in the piston to surround the bearing shoe. In another case, the seal is mounted in the bearing shoe to surround the piston.

In still another embodiment, the annular seal is mounted in the piston to seal against a cylindrical surface of the bearing shoe. In this case, a clearance is provided between the bearing shoe and piston to allow pivoting therebetween.

The invention also provides a retaining means to prevent complete lift off of a bearing shoe from the pressure piston.

These and other objects and advantages of the invention will become more apparent from the following detailed description and appended claims taken in conjunction with the accompanying drawings in which:

FIG. 4 illustrates a view similar to FIG. 2 of a further modified pressure transmitting means wherein the annular seal is in the piston and engages a cylindrical surface on the bearing shoe; and FIG. 5 illustrates a view similar to FIG. 2 of a pressure transmitting means according to the invention with a retaining means and an annular seal in the bearing shoe.

Figure 1:
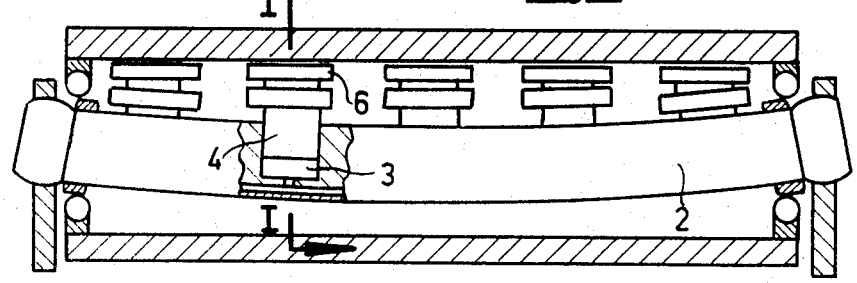
FIG. 1 illustrates a vertical axial section through a roller with flexure equalization according to the invention.

Referring to FIG. 1, the roller which is intended for the pressure treatment of paper wes comprises a hollow cylindrical rotatable shell 1 and a non-rotating yoke 2. The yoke 2 extends through the shell 1 and is supported at both ends via a suitable means in a support. Suitable bearings are mounted between the yoke 2 and shell 1, as shown, to allow rotation of the shell 1 on the yoke 2. A pressure transmitting means is located between the shell 1 and yoke 2 to impose an internal force on the shell 1 during operation in order to counteract the flexure which would otherwise occur in the shell 1. This means includes a plurality of cylinders 3 (only one of which is shown for simplicity) in the yoke 2, a pressure piston 4 slidably mounted in each cylinder 3, a joint 5 (FIG. 2) in the form of a ball bearing on each piston 4 and a bearing shoe 6 pivotally mounted on the piston 4 via the joint 5.

Figure 2:
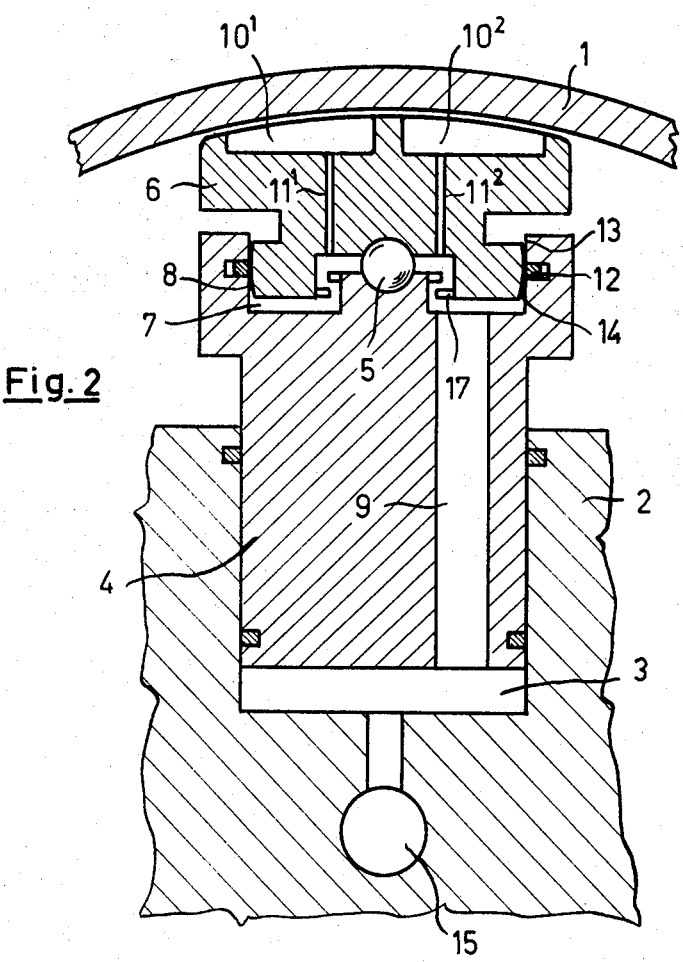
FIG. 2 illustrates a sectional view taken on line I—I of FIG. 1 to an enlarged scale.

Referring to FIG. 2, the piston 4 has a cup-shaped recess into which the bearing shoe 6 is slidably mounted so that the piston 4 and shoe 6 define a relief pressure chamber 7. In addition, an annular seal 8 is disposed between the bearing shoe 6 and the pressure piston 4 in a plane that extends through the pivoting point of the joint 5 and is situated perpendicularly to the axis of the pressure piston 4. The relief pressure chamber 7 is in communication via a connecting duct 9 with the pressure chamber defined by the cylinder 3. In this way, the relief pressure chamber 7 can be biased with pressure medium for the partial relief of the joint 5.

Each bearing shoe 6 is provided with hydrostatic bearing pockets $10^1$, $10^2$ which communicate with the relief pressure chamber 7 via connecting ducts $11^1$, $11^2$. The two connecting ducts $11^1$, $11^2$ are constructed in such a way as to function as restrictor means to the pressure medium which flows through.

The annular seal 8 is in the form of a ring seal 12 having an outer part guided in a groove 13 of that part of the pressure piston 4 which surrounds the relief pressure chamber 7. The internal surface of the ring seal 12 bear sealingly on a spherical surface 14 of the shoe 6. In addition, the pivoting point of the joint 5 and the spherical center of the spherical surface 14 coincide.

A duct 15 is provided in the yoke 2 to supply pressure medium to the cylinder 3 from a suitable source (not shown).

During operation, pressure medium flows from the duct 15 into the cylinder 3 and thence through the connecting duct 9 into the relief pressure chamber 7. The pressure medium thereafter flows from the relief pressure chamber 7 via the connecting ducts $11^1$, $11^2$ into the bearing pockets $10^1$ or $10^2$ respectively, of the bearing shoe 6. The effective pressure transfer surface of the pressure chamber of the cylinder 3, the effective pressure transfer surface between the bearing shoe 6 and the shell 1, and the restrictor action of the connecting ducts $11^1$, $11^2$ are matched to each other so that the intermediate member comprising the bearing shoe 6 and the pressure piston 4 floats in stable equilibrium between the shell 1 and the yoke 2 when the thickness of the gap between the edge of the bearing shoe 6 and the shell 1 is as desired.

Since the pressure medium which arrives through the duct 15 is practically unrestricted in the connecting duct 9, it follows that the pressure in the cylinder 3 will have the same magnitude as the pressure in the relief pressure chamber 7. The effective pressure transfer surface of the relief pressure chamber 7 is thus made slightly smaller than the effective pressure transfer surface of the pressure chamber of the cylinder 3. In this way, the pressure medium which is disposed in the relief pressure chamber 7 serves to relieve the joint 5 at least partially of load.

Since the difference between the effective-pressure transfer surfaces of the chambers 3 and 7 is kept very small, the load applied to the joint 5 is also correspondingly small. While the joint 5 is substantailly relieved of the force which is to be transmitted between the shoe 6 and the pressure piston 4, the principal portion of the force to be transmitted acts on the pressure medium which is disposed in the relief pressure chamber 7. The shoe 6 therefore floats practically without friction and at an inclination to the pressure piston 4. The joint 5, on the other hand, forms a radial bearing for the shoe 6 with respect to the axis of the pressure piston 4.

Figure 3:
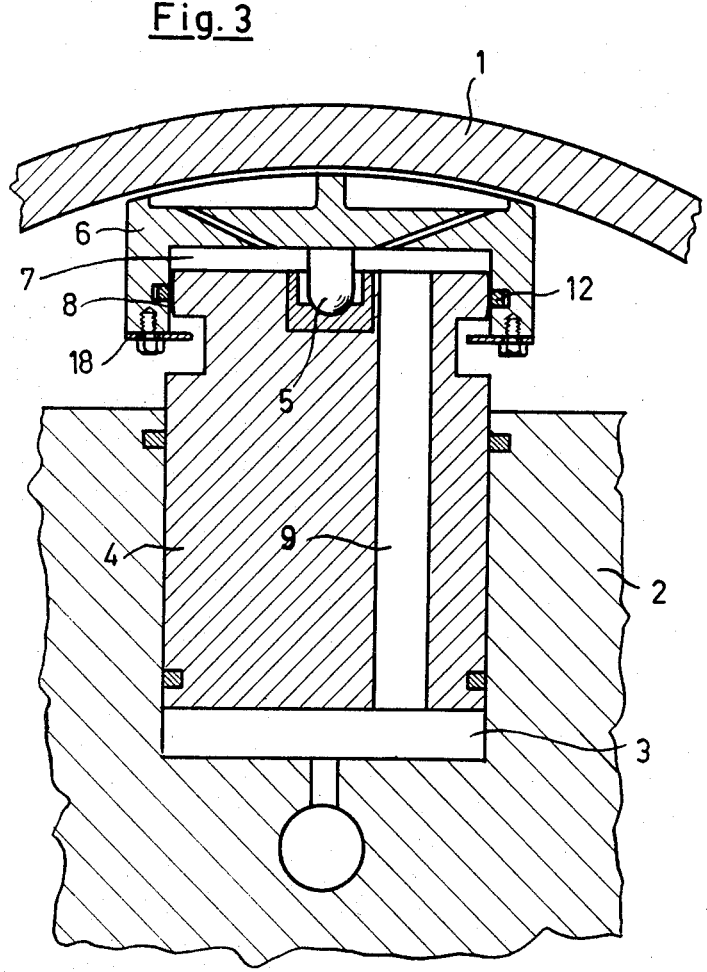
FIG. 3 illustrates a view similar to FIG. 2 of a modified pressure transmitting means according to the invention.

Referring to FIG. 3, wherein like reference characters indicate like parts as above, instead of forming the relief pressure chamber 7 by means of a cylinder in the pressure piston 4 and a spherical piston of the shoe 6, the relief pressure chamber can alternatively be formed in the shoe 6 by means of a cup-shaped cylindrical recess into which a spherical piston head disposed on the pressure piston 4 engages.

Referring to FIG. 4, wherein like reference characters indicate like parts as above, the joint 5 is formed by a cone whose end is radiased and which bears in a cup in the piston 4. The annular seal 8 is in the form of a ring seal 12 which is guided on one side in a groove of an annular portion 16 of the piston 4 which is short in the axial orientation of the ring seal 12 and bears sealingly on the other side on a cylindrical surface with the bearing shoe 6. The annular portion 16 is so short in the axial orientation with a circumferential surface chamfered to such an extent that the portion 16 still retains a clearance with respect to the shoe 6 even when the shoe 6 is in an inclined position.

As shown in FIG. 4, both the connecting ducts $11^1$, $11^2$ which are disposed in the shoe 6 and the connecting duct 9 which is disposed in the pressure piston 4, are constructed to function as a restrictor means.

During operation, a pressure medium is supplied through the duct 15, flows into the pressure chamber of the cylinder 3, through the connecting duct 9 into the relief pressure chamber 7, through the connecting ducts $11^1$, $11^2$ into the bearing pockets $10^1$, $10^2$ and finally through the gap between the edge of the bearing shoe 6 and the shell 1. The effective pressure transfer surfaces of the pressure chamber of a cylinder 3, of the relief pressure chamber 7 and of the hydrostatic bearing system between the bearing shoe 6 and the shell 1 and the restrictor effect of the connecting ducts 9, $11^1$, $11^2$ are all matched to each other so that the intermediate member comprising the bearing shoe 6 and the pressure piston 4 floats in equilibrium between the shell 1 and the yoke 2 for the desired magnitude of the gap between the shell 1 and the bearing shoe 6.

In use, the pressure of the pressure medium drops from the value in the cylinder 3 to a value in the relief pressure chamber 7 and further to a value in the bearing pockets $10^1$ and $10^2$. The system is matched as described hereinabove in such a way that the pressure medium which is disposed in the relief pressure chamber 7 does not absorb the entire force that is to be transmitted from the shell 1 to the yoke 2 but only the greater part of this force. Thus, a small part of the force is transmitted by the joint 5 to ensure that the joint 5 retains some bearing capacity and remains in position.

Referring to FIG. 5, wherein like reference characters indicate like parts as above, only the connecting duct 9 in the pressure piston 4 is constructed as a restrictor means while the connecting duct 11 has no restrictor action. The pressure in the relief pressure chamber 7, in this case, therefore, has the same magnitude as the pressure in the bearing pocket 10. The corresponding central bearing pocket 10 is surrounded by a broader edge in order to stabilize the bearing shoe 6 relative to the shell 1. However, the edge is provided with at least two but preferably three or more bearing pockets which are distributed in the circumferential orientation (only the bearing pockets $10^3$ and $10^4$ being shown for simplicity). This substantially reduces friction between the stabilizing edge and the shell 1.

In the embodiments illustrated in FIGS. 1 to 4, the bearing shoe 6 is stabilized with respect to the shell by virtue of there being at least two but preferably three or more bearing pockets $10^1$, $10^2$ in the bearing shoe 6 with each of the pockets communicating with the relief pressure chamber 7 through a separate connecting duct $11^1$, $11^2$ which is constructed to furnction as a restrictor.

In all the illustrated embodiments, the joints 5 merely restrict the approach between the bearing shoe 6 and the pressure piston 4. In order to prevent a complete lift off of the bearing shoe 6 from the pressure piston 4, a retaining means is provided. This retaining means enables the pressure piston 4 to be moved towards the shell 1 when the roller is operating. As shown in FIG. 2, the retaining means is in the form of a bayonet closure 17. As shown in FIGS. 3 to 5, the retaining means is alternatively constructed as a two-Part annular disc 18 which is bolted on the bearing shoe 6. In the illustrated position of the roller, the retaining means have sufficient clearance to ensure that inclination of the bearing shoe 6 to the pressure piston 4 in not obstructed.

What is claimed is:

1. A roller for pressure treatment of webs comprising a hollow cylincrical rotatable shell;
   a non-rotatable yoke extending through said shell and having means at each end for supporting said yoke in a support; and
   means for transmitting pressure between said yoke and said shell, said means including cylinders in said yoke, a pressure piston slidably mounted in each cylinder, a joint on each piston, a bearing shoe mounted on each joint for bearing against said shell, each said bearing shoe and piston defining a relief pressure chamber therebetween to receive a pressure medium for partially relieveing said joint, and an annular seal between each said bearing shoe and said piston disposed in a plane extending through a pivot point of said joint, at least one of said piston and said bearing shoe having a spherical surface in sealing engagement with said seal.

2. A roller as set forth in claim 1 wherein each said cylinder and said piston therein define a pressure chamber for receiving a pressure medium and which further comprises a connecting duct communicating said pressure chamber and said relief pressure chamber.

3. A roller as set forth in claim 2 wherein each said bearing shoe has a hydrostatic bearing pocket in the surface thereof and which further comprises a second connecting duct communicating said relief pressure chamber and said hydrostatic bearing pocket, at least one of said ducts being a restrictor means to a flow of pressure medium therethrough.

4. A roller as set forth in claim 2 wherein each said bearing shoe has at least two bearing pockets in the surface thereof and which further comprises connecting ducts communicating each said pocket with said relief pressure chamber, said latter connecting ducts each being a restrictor means to a flow of pressure medium therethrough.

5. A roller as set forth in claim 1 wherein said spherical surface is on said bearing shoe and is received in said piston and said seal is a ring seal guidably received in a groove of said piston and having an internal surface sealingly engaging said spherical surface, said spherical surface having a center coincident with said pivot point of said joint.

6. A roller as set forth in claim 1 wherein said spherical surface is on said piston and is received in a bearing shoe and said seal is a ing seal guidably received in a groove of said bearing shoe and having an internal surface sealingly engaging said spherical surface, said spherical surface having a center coincident with said pivot point of said joint.

7. A roller as set forth in claim 1 wherein each said piston has an annular shoulder received in a bearing shoe and said seal is a ring seal guidably received in a groove of said shoulder and having an external surface sealingly engaging a cylindrical surface of said bearing shoe.

8. A means for transmitting pressure between a hollow cylindrical rotatable shell and a non-rotatable yoke, said means including
   a cylinder,
   a pressure piston slidably mounted in said cylinder,
   a joint on said piston,
   a bearing shoe pivotally mounted on said joint and defining a chamber with said piston for receiving a pressure medium,
   an annular seal between said piston and said bearing shoe in a plane extending through a pivot point of said joint, and
   at least one of said piston and said bearing shoe having a spherical surface in sealng engagement with said seal.

9. A means as set forth in claim 8 wherein at least one of said piston and said bearing shoe has a groove slidably receiving said seal therein.

* * * * *

UNITED STATES PATENT OFFICE
CERTIFICATE OF CORRECTION

Patent No. 3,846,883            Dated November 12, 1974

Inventor(s) Mario Biondetti

It is certified that error appears in the above-identified patent and that said Letters Patent are hereby corrected as shown below:

Column 5, line 16, correct the spelling of "cylindrical"

line 27, correct the spelling of "relieving"

Column 6, line 16, correct the spelling of "ring"

line 41, correct the spelling of "sealing".

Signed and Sealed this third Day of February 1976

[SEAL]

Attest:

RUTH C. MASON
*Attesting Officer*

C. MARSHALL DANN
*Commissioner of Patents and Trademarks*